US012458198B2

(12) United States Patent
Lu et al.

(10) Patent No.: US 12,458,198 B2
(45) Date of Patent: Nov. 4, 2025

(54) DISHWASHER

(71) Applicant: FOSHAN SHUNDE MIDEA WASHING APPLIANCES MANUFACTURING CO., LTD., Guangdong (CN)

(72) Inventors: Jialiang Lu, Guangdong (CN); Zhao Yuan, Guangdong (CN); Yu Lin, Guangdong (CN); Jiangang Mo, Guangdong (CN); Chengying Zhao, Guangdong (CN)

(73) Assignee: FOSHAN SHUNDE MIDEA WASHING APPLIANCES MANUFACTURING CO., LTD., Guangdong (CN)

( * ) Notice: Subject to any disclaimer, the term of this patent is extended or adjusted under 35 U.S.C. 154(b) by 140 days.

(21) Appl. No.: 18/211,736

(22) Filed: Jun. 20, 2023

(65) Prior Publication Data

US 2024/0008710 A1 Jan. 11, 2024

(30) Foreign Application Priority Data

Jul. 6, 2022 (CN) ......................... 202221730177.3

(51) Int. Cl.

| | |
|---|---|
| ***A47L 15/42*** | (2006.01) |
| ***E05D 11/08*** | (2006.01) |
| ***E05F 15/616*** | (2015.01) |

(52) U.S. Cl.

CPC ....... *A47L 15/4259* (2013.01); *A47L 15/4261* (2013.01); *E05D 11/082* (2013.01); *E05F 15/616* (2015.01); *E05Y 2900/304* (2013.01)

(58) Field of Classification Search

CPC .............. A47L 15/4259; A47L 15/4261; E05F 15/616; E05D 11/082; E05Y 2201/426; E05Y 2900/304

See application file for complete search history.

(56) References Cited

U.S. PATENT DOCUMENTS 4,951,693 A * 8/1990 Archambault ...... A47L 15/0034 134/58 DL
7,731,806 B2 * 6/2010 Hapke ................. E05B 17/0029 134/58 DL
8,905,494 B2 * 12/2014 Kilic ................... A47L 15/4259 312/328
9,084,526 B2 * 7/2015 Assmann ............ A47L 15/4259

(Continued)

*Primary Examiner* — James O Hansen

(74) *Attorney, Agent, or Firm* — Scully, Scott, Murphy & Presser, P.C.

(57) ABSTRACT

A dishwasher is provided. The dishwasher has an inner container, a door body, a door lock mechanism, an ejection mechanism and an auxiliary door opening mechanism. The an inner container has a washing chamber and an opening in communication with the washing chamber. The door body is rotatably connected to the inner container by a hinge for opening or closing the opening. The door lock mechanism locks the door body to the inner container. The ejection mechanism is disposed in the inner container for exerting an acting force to the door body to cause the door body to be unlocked from the inner container. The auxiliary door opening mechanism is provided on the inner container for exerting the acting force to the hinge, to cause the door body to exhibit a tendency to rotate and open relative to the inner container.

14 Claims, 17 Drawing Sheets

(56) References Cited

U.S. PATENT DOCUMENTS

| | | | | |
|---|---|---|---|---|
| 9,474,433 | B2 * | 10/2016 | Unverdi | A47L 15/488 |
| 2006/0283482 | A1 * | 12/2006 | Berends | A47L 15/0034<br>134/25.2 |
| 2011/0074261 | A1 * | 3/2011 | Assmann | A47L 15/4259<br>312/326 |
| 2016/0130854 | A1 * | 5/2016 | Carli | F16H 19/04<br>74/32 |
| 2021/0131161 | A1 * | 5/2021 | Contreras | E05F 15/70 |
| 2022/0273157 | A1 * | 9/2022 | Dirnberger | A47L 15/4259 |

* cited by examiner

DISHWASHER

CROSS-REFERENCE TO RELATED APPLICATION

The application claims the priority to Chinese Patent Application No. 202221730177.3, filed on Jul. 6, 2022, which is incorporated herein by reference in its entirety. No new matter has been introduced.

TECHNICAL FIELD

The present disclosure relates to the technical field of kitchen appliances, and in particular to a dishwasher.

BACKGROUND

With the improvement of life quality of people, dishwashers are becoming more and more popular. A dishwasher generally has washing and drying functions. After washing, a tableware in a washing chamber of the dishwasher is dried at a high temperature. The higher the temperature, the better the drying effect. But this operation also brings about a problem of increased energy consumption. Moreover, since the washing chamber, during the entire drying process, is always in a closed environment, the water vapor cannot be discharged in time. After the temperature drops, the water vapor will condense, resulting in secondary humidity in the washing chamber, and the drying effect is thus affected.

SUMMARY

The present disclosure is intended to propose a dishwasher to at least improve drying effect of a dishwasher and to reduce energy consumption.

In accordance with an embodiment of the disclosure, a dishwasher is provided, which may include: an inner container having a washing chamber and an opening which is in communication with the washing chamber; a door body rotatably connected to the inner container by a hinge and used to open or close the opening; a door lock mechanism used to lock the door body to the inner container; an ejection mechanism disposed on the inner container and used to exert an acting force on the door body, to cause the door body to be unlocked from the inner container; and an auxiliary door opening mechanism, disposed on the inner container and used to exert an acting force on the hinge, to cause the door body to exhibit a tendency to rotate and open relative to the inner container.

In some embodiments, a bottom of the door body may be rotatably connected to the inner container by the hinge. The ejection mechanism may be disposed on a top of the inner container. The auxiliary door opening mechanism may be disposed at a bottom of the inner container.

In some embodiments, the auxiliary door opening mechanism may include a bracket, an abutting member and an elastic member. The bracket may be fixed to the inner container. The abutting member may be movably mounted on the bracket. The elastic member is disposed between the bracket and the abutting member, and used to provide a maintaining force for the abutting member to abut against the hinge.

In some embodiments, the bracket may include a first baffle plate and a second baffle plate that are oppositely disposed and spaced apart. The abutting member may include a push rod and a limiting flange which is disposed on an outer periphery of the push rod. The first baffle plate and the second baffle plate are respectively and correspondingly provided with a first through hole and a second through hole. The push rod is slidably penetrated into the first through hole and the second through hole. An end of the push rod passes through the first baffle plate and abuts against the hinge. The limiting flange is located between the first baffle plate and the second baffle plate. An end of the elastic member elastically abuts against the second baffle plate, and another end of the elastic member elastically abuts against the limiting flange.

In some embodiments, an end of the push rod passing out of the first baffle plate may be provided with a push head that abuts against and fits with the hinge. The cross sectional area of the push head may be larger than that of the push rod.

In some embodiments, the inner container may be fixed with a hinge support piece. The hinge may be rotatably connected to the hinge support piece. The bracket may be fixedly connected to the hinge support piece member.

In some embodiments, the bracket may include a fixing plate and a fixing foot. The fixing plate may be arranged opposite to the hinge support piece. The fixing foot may be bent relative to the fixing plate toward the hinge support piece. The fixing plate may be provided with a first connection hole for a first fastener to pass through. The hinge support piece may be provided with a second connection hole corresponding to the first connection hole. The hinge support piece may be also provided with a fixing hole for the fixing foot to be inserted in and placed on.

In some embodiments, a snap hook may be provided at a bottom of the fixing foot. The snap hook may be snapped with a side wall of the fixing hole.

In some embodiments, the dishwasher may further include a positioning mechanism disposed between the inner container and the door body. The positioning mechanism may be used to enable the door body to be maintained a preset open position relative to the inner container.

In some embodiments, the positioning mechanism may include a tension spring, a first pull cord, a second pull cord, a positioning piece and a positioning fitting piece. The positioning piece may be fixed between the first pull cord and the second pull cord. An end of the first pull cord far away from the positioning member is connected to the inner container by the tension spring. An end of the second pull cord far away from the positioning member is connected to the hinge. The positioning fitting piece is fixed to the inner container, and the positioning fitting piece is limitedly abutted against a side of the positioning fitting piece that is away from the door body.

In some embodiments, the inner container may be provided with a mounting slot. The amounting slot may be formed with a mounting port on an outer surface of the inner container. The tension spring, the first pull cord, the positioning piece and a portion of the second pull cord may be all accommodated in the mounting slot. The positioning fitting piece may be fixed within in the mounting slot.

In some embodiments, the mounting slot may have a side groove wall disposed opposite to the mounting port, and a top groove wall and a bottom groove wall respectively disposed on two opposite sides of the side groove wall. The top groove wall and the bottom groove wall each are provided with a snap groove. The snap groove extends from the side groove wall toward the mounting port. An end of the snap groove close to the mounting port is formed with a socket for an insertion of the positioning fitting piece. Two opposite sides of the positioning fitting piece are snapped with a corresponding snap groove, respectively.

In some embodiments, the positioning fitting piece may include a fixing part which may be disposed opposite to the side groove wall. The fixing part is provided with a first mounting hole for fasteners to pass through for connecting. The side groove wall is provided with a second mounting hole corresponding to the first mounting hole.

In the technical solution according to some embodiments of the present disclosure, the door lock mechanism can lock the door body to the inner container to ensure a safety of a washing process of the dishwasher. When the dishwasher enters a drying stage, the ejection mechanism exerts an acting force on the door body to unlock the door body from the inner container; and the auxiliary door opening mechanism exerts an acting force on the hinge to cause that the door body have a tendency to rotate and open relative to the inner container. When the door body is unlocked, the automatic door opening function can be realized under an action of the auxiliary door opening mechanism. Since the door body, during the drying stage can be automatically opened to a preset open position relative to the inner container to enable the washing chamber of the inner container to be in communication with an external environment, a circulation of internal and external airflow can be realized, a water vapor in the washing chamber can be quickly discharged to improve drying effect. Moreover, since a drying process is implemented by using the circulation of internal and external airflow, a drying temperature in the washing chamber can be set low accordingly, to achieve reduced energy consumption.

BRIEF DESCRIPTION OF DRAWINGS

In order to more clearly illustrate the technical solutions in the embodiments of the present disclosure or the related arts, the following will briefly introduce the accompanying drawings that need to be used in the description of the embodiments or the related arts. Obviously, the accompanying drawings in the following description are only some embodiments of the present disclosure, and those skilled in the art can also obtain other drawings according to the structures shown in these drawings without creative work.

Figure 1:
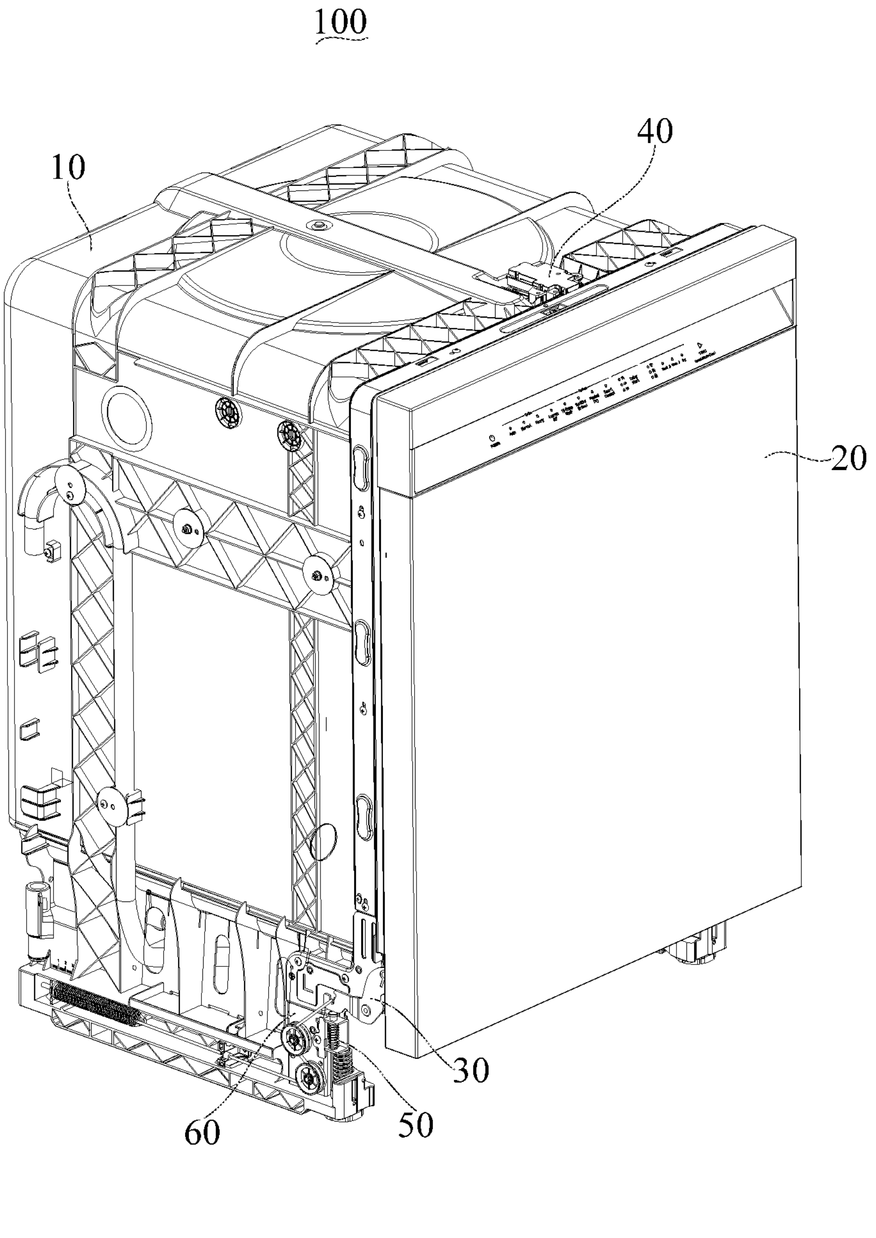
FIG. 1 is a structural schematic diagram of a dishwasher according to some embodiments of the present disclosure.

Explanation of reference numbers shown in the figures is provided in the following table.

| Reference number | Name | Reference number | Name |
|---|---|---|---|
| 100 | dishwasher | 515 | fixing foot |
| 10 | inner container | 516 | snap hook |
| 11 | mounting slot | 52 | abutting member |
| 12 | snap groove | 521 | push rod |
| 13 | second mounting hole | 522 | limiting flange |
| 20 | door body | 523 | push head |
| 30 | hinge | 53 | elastic member |
| 40 | ejection mechanism | 60 | hinge support piece |
| 41 | driving assembly | 61 | second connection hole |
| 411 | housing | 62 | fixing hole |
| 412 | wax motor | 70 | door lock mechanism |
| 413 | elastic element | 80 | positioning mechanism |
| 42 | ejector | 81 | tension spring |
| 50 | auxiliary door opening mechanism | 82 | first pull cord |
| 51 | bracket | 83 | second pull cord |
| 511 | first baffle plate | 84 | positioning piece |
| 5111 | first through hole | 85 | positioning fitting piece |
| 512 | second baffle plate | 851 | positioning part |
| 5121 | second through hole | 852 | snap part |
| 513 | connecting plate | 853 | fixing part |
| 514 | fixing plate | 854 | notch |
| 5141 | first connection hole | 855 | first mounting hole |

The realization of a purpose, functional characteristics and advantages of the present disclosure will be further described in conjunction with the embodiments and with reference to the accompanying drawings.

DESCRIPTION OF EMBODIMENTS

The technical solutions in the embodiments of the present disclosure will be clearly and completely described below in conjunction with the accompanying drawings in the embodiments of the present disclosure. Obviously, the described embodiments are only part of the embodiments of the present disclosure, not all of the embodiments. Based on the embodiments of the present disclosure, all other embodiments obtained by persons of ordinary skill in the art without making creative efforts belong to the scope of protection of the present disclosure.

It should be noted that, if there are directional indications (such as up, down, left, right, front, back . . . ) in embodiments of the present disclosure, the directional indications are only used to explain a relative position relationship and/or a state of motion among various components in a specific posture. If the specific posture changes, the directional indication will also change accordingly.

In addition, if there are descriptions involving "first", "second" etc. in the embodiments of the present disclosure, the descriptions of "first", "second", etc. are used only for a purpose of description and shall not be understood to indicate or imply their relative importance, or designate implicitly the number of technical features indicated. Therefore, the features defined with "first" and "second" may explicitly or implicitly include at least one of the features. In addition, if an expression of "and/or" or "as well as/or" appears throughout the text, its meaning includes three parallel schemes. The expression of "A and/or B" is taken as an example, which includes a scheme including A, or a scheme including B, or a scheme in which A and B are included at the same time. In addition, the technical solutions of the various embodiments can be combined with each other, but a technical solution combined by technical solutions of the various embodiments shall be capable of being realized by those skilled in the art. When a combination of technical solutions is contradictory or cannot be realized, it should be considered that the combination of technical solutions does not exist, and is not within a scope of protection sought for by the present disclosure.

A dishwasher 100 is provided according to some embodiments of the present disclosure.

Figure 2:
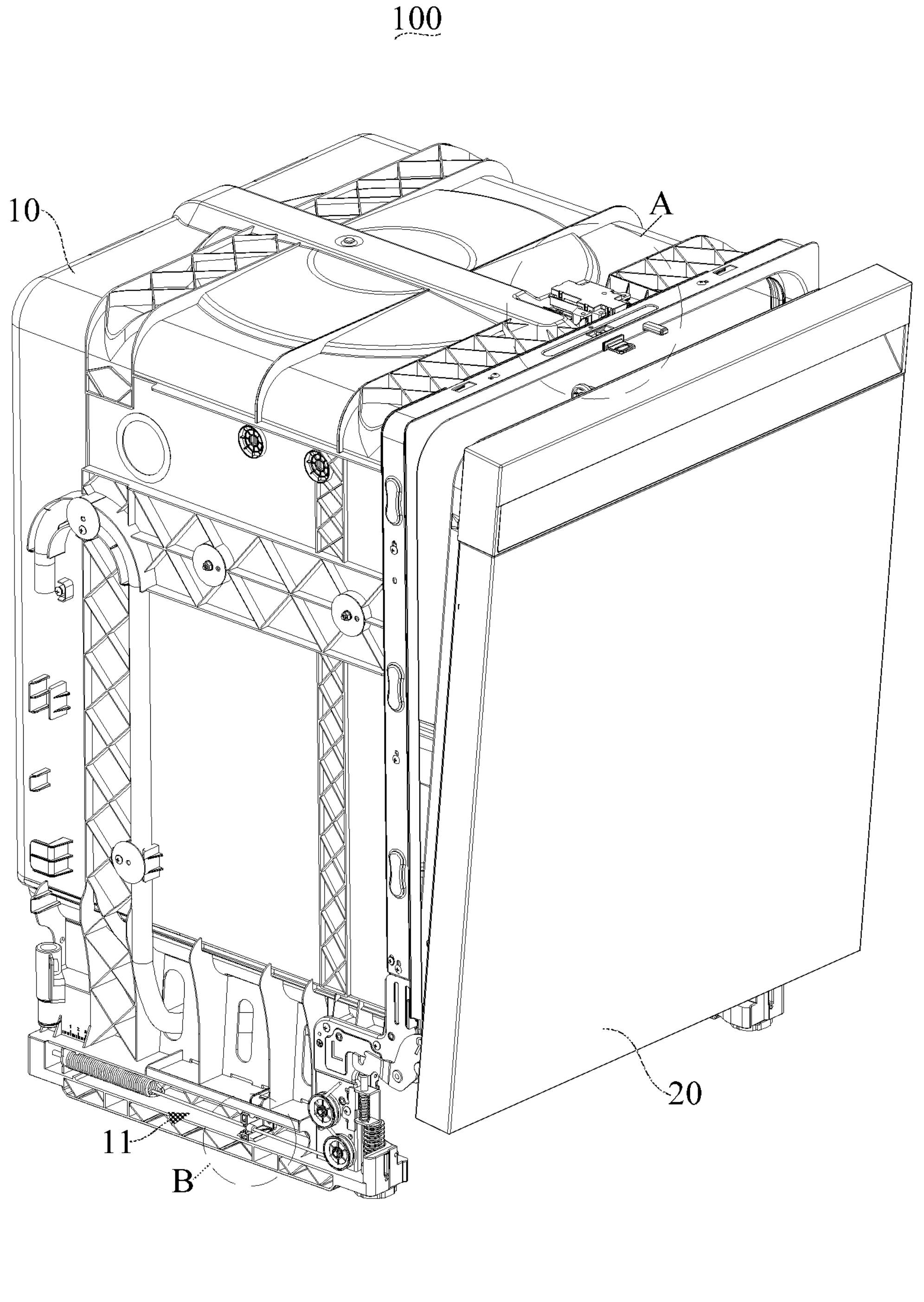
FIG. 2 is a structural schematic diagram of the dishwasher in FIG. 1 with a door body in an open state.
Figure 3:
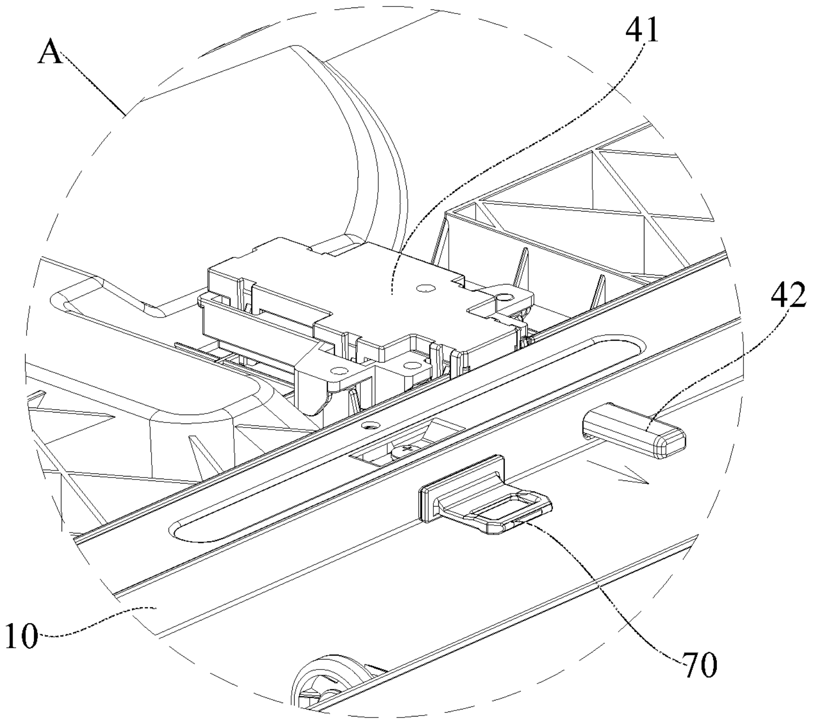
FIG. 3 is a partial enlarged view of a portion indicated by A in FIG. 2.
Figure 4:
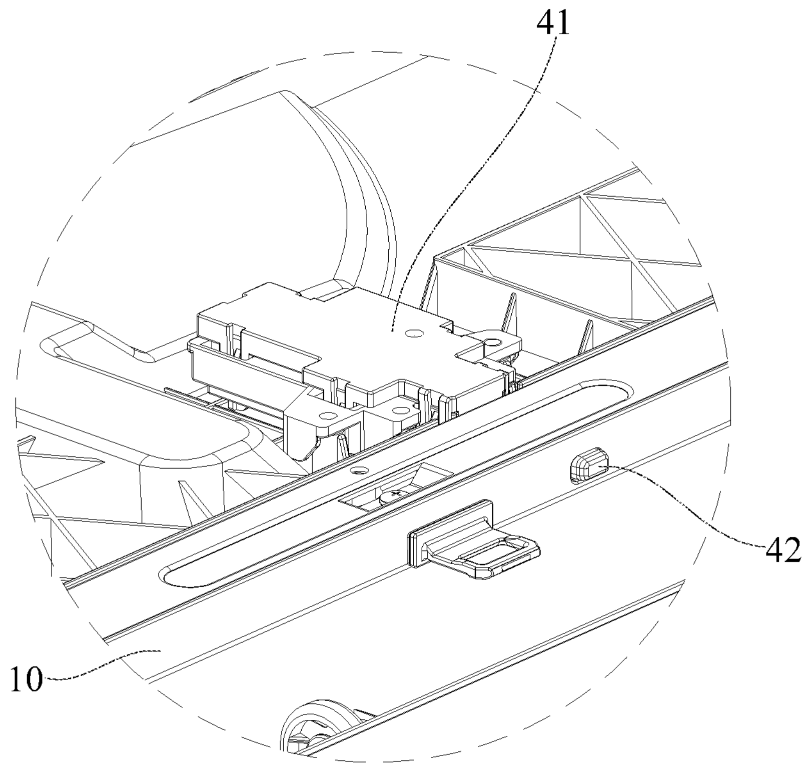
FIG. 4 is a schematic diagram of a state of an ejector in FIG. 3 before being ejected.

FIG. 1 is a schematic structural diagram of a dishwasher according to some embodiments of the present disclosure; FIG. 2 is a structural schematic diagram of the dishwasher in FIG. 1 with a door body in an open state; FIG. 3 is a partial enlarged view of a portion indicated by A in FIG. 2; and FIG. 4 is a schematic diagram of a state of an ejector in FIG. 3 before being ejected.

As shown in FIG. 1 to FIG. 4, in some embodiments, the dishwasher 100 may include an inner container 10, a door body 20, a door lock mechanism 70, an ejection mechanism 40 and an auxiliary door opening mechanism 50. The inner container 10 may have a washing chamber and an opening which is in communication with the washing chamber. The door body 20 may be rotatably connected to the inner container 10 by a hinge 30. The door body 20 may be used to open or close the opening. The door lock mechanism 70 may be used to lock the door body 20 to the inner container 10. The ejection mechanism 40 may be provided on the inner container 10, and used to exert an acting force on the door body 20, to cause the door body 20 to be unlocked from the inner container 10. The auxiliary door opening mechanism 50 is disposed on the inner container 10 and may be used to exert the acting force to the hinge, to cause that the door body 20 may exhibit a tendency to rotate and open relative to the inner container 10.

In some embodiments, a washing chamber is formed inside the inner container 10, and can be used to place tableware. An opening, which is in communication with the washing chamber, is formed on a front side of the inner container 10, and the user can take and place the tableware through the opening. The door body 20 is rotatably mounted on the front side of the inner container 10 by the hinge 30. In order to ensure a reliability of a rotational connection between the door body 20 and the inner container 10, the door body 20 and the inner container 10 may be generally rotatably connected by at least two hinges 30. It should be noted that a connection between the door body 20 and the inner container 10 by the hinge 30 may be a direct connection or an indirect connection, as long as the door body 20 can be rotated relative to the inner container 10. In some embodiments, the door body 20 may be directly connected to the inner container 10 by the hinge 30, or the door body 20 may be connected by the hinge 30 to other components (such as, a hinge support piece 60) mounted on the inner container 10, and thus the connection between the door body 20 and the inner container 10 is realized. In some embodiments, a bottom of the door body 20 is rotatably connected to the inner container 10, and a top of the door body 20 can be rotatably opened and closed relative to the inner container 10. In some embodiments, it may be one of a left side, a right side or a top side of the door body 20 which is rotatably connected to the inner container 10.

The door lock mechanism 70 is used to lock the door body 20 to the inner container 10. In some embodiments, the door lock mechanism 70 may include a locking piece disposed on the inner container 10 and a locking fitting piece disposed on the door body 20. The locking piece and the locking fitting piece can be locked together by way of fastening, magnetic fixation, etc. . . In some embodiments, the locking piece may be a lock catch, and the locking fitting piece may be a lock hook. When the door body 20 is closed relative to the inner container 10, the locking between the door body 20 and the inner container 10 can be realized by snapping the lock catch with the lock hook. In some embodiments, both the locking piece and the locking fitting piece may adopt magnetic suction parts.

The ejection mechanism 40 is used to exert an acting force on the door body 20 to unlock the door body 20 from the inner container 10. In some embodiments, as shown in FIG. 3 and FIG. 4, the ejection mechanism 40 may include a driving assembly 41 and an ejector 42 that is drivingly connected to the driving assembly 41. The driving assembly 41 is mounted on the inner container 10 and is used to drive the ejector 42 to approach or move away from the door body 20. When the door body 20 is closed, the driving assembly 41 drives the ejector 42 toward a side away from the door body 20 to move to a retracted position. At this moment, the ejector 42 may not interfere with a normal closing of the door body 20. When the door body 20 needs to be opened, the driving assembly 41 drives the ejector 42 toward a side close to the door body 20 to move to a protruding position. The ejector 42 may abut against the door body 20 in a process of protruding, to exert a thrust to the door body 20, and then the locking piece of the door lock mechanism 70 can be disengaged from the locking fitting piece, to unlock the door body 20 from the inner container 10.

The door body 20 is rotatably connected to the inner container 10 by the hinge 30. The auxiliary door opening mechanism 50 is disposed at a position of the inner container 10 close to the hinge 30.

Figure 7:
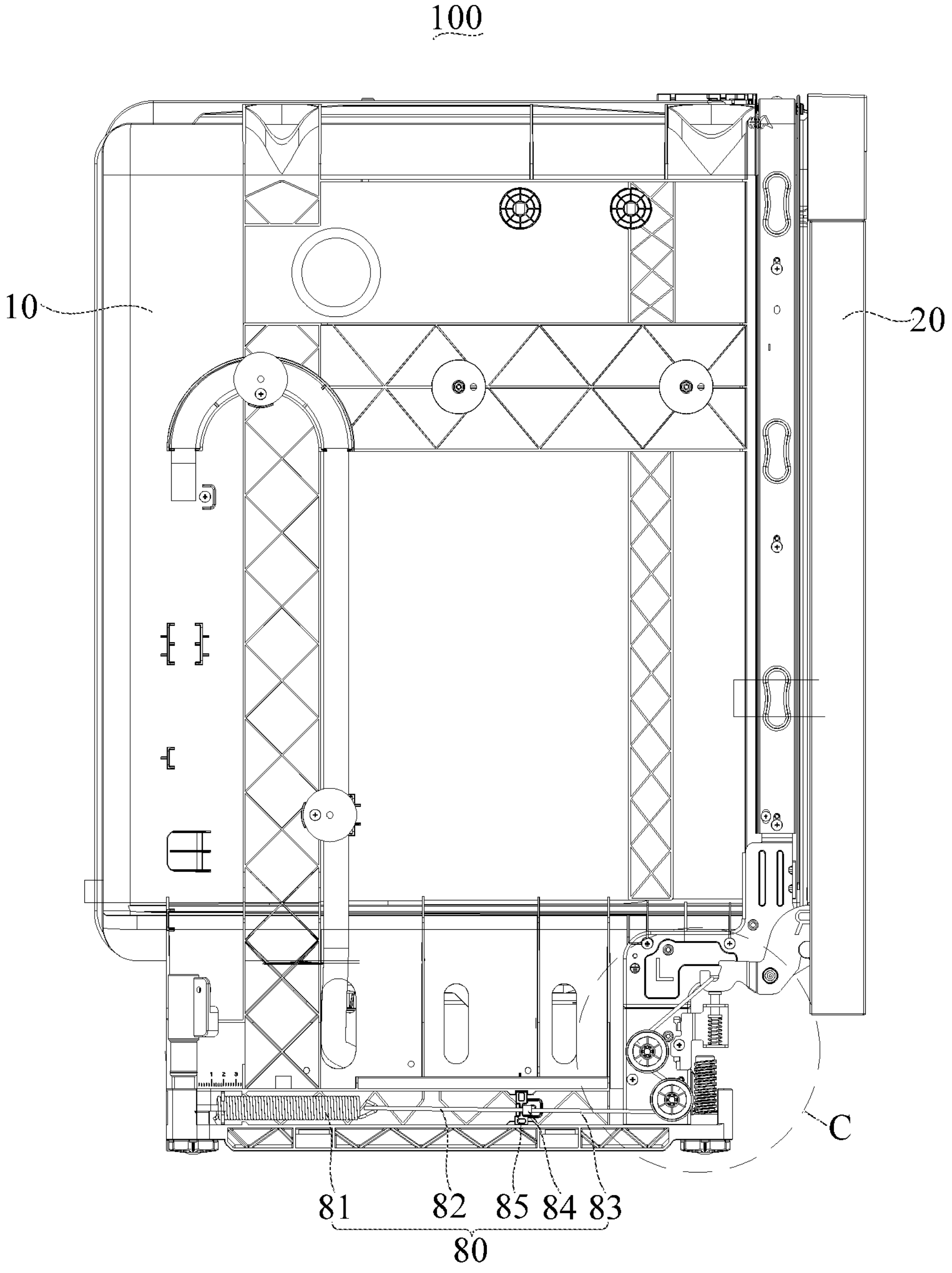
FIG. 7 is a side view of the dishwasher in FIG. 1 with the door body in a closed state.
Figure 8:
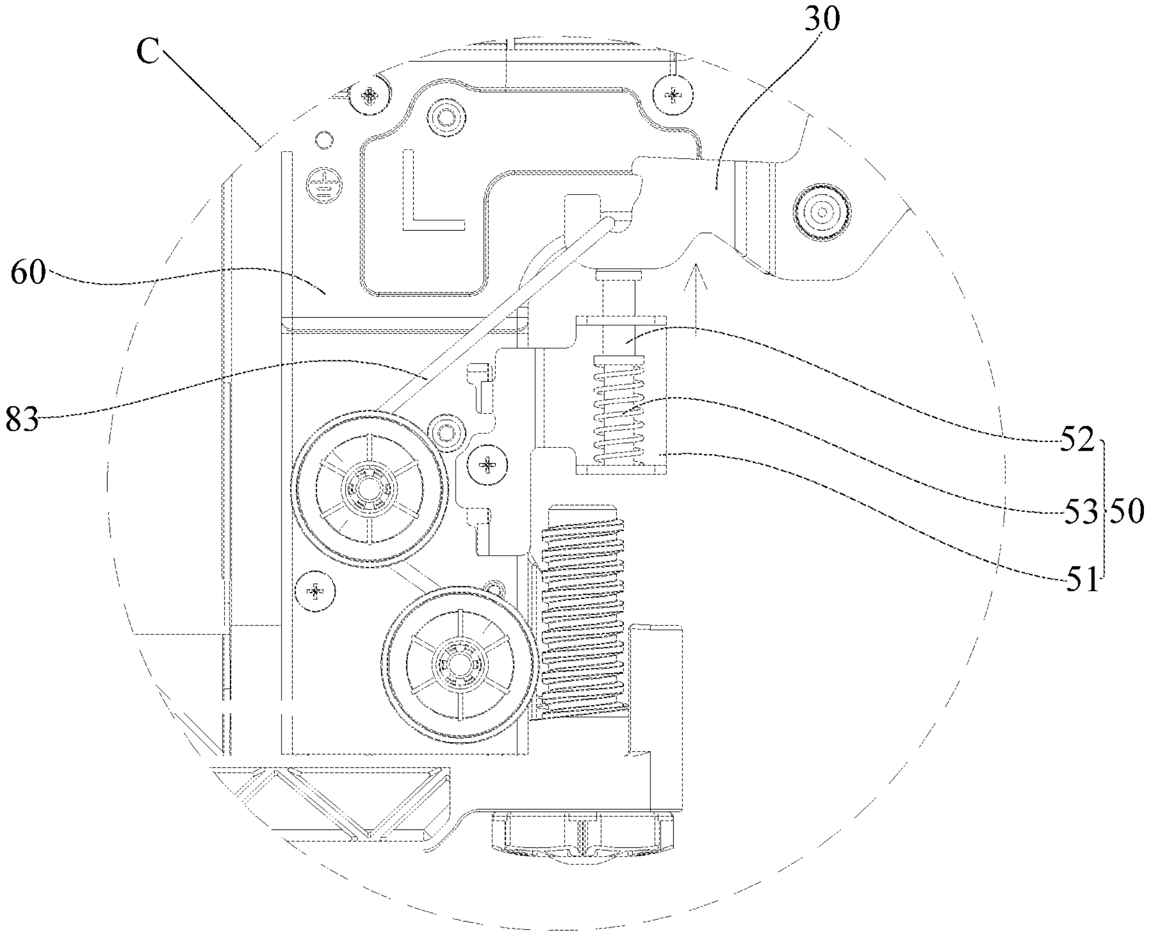
FIG. 8 is a partial enlarged view of a portion indicated by C in FIG. 7.

FIG. 7 is a side view of the dishwasher in FIG. 1 with a door body in a closed state. FIG. 8 is a partial enlarged view of a portion indicated by C in FIG. 7. As shown in FIG. 7 and FIG. 8, in some embodiments, the hinge 30 is generally in an L-shaped structure. Corners of the hinge 30 are rotatably connected to the inner container 10. A first rotation arm and a second rotation arm are respectively formed on two opposite sides of a rotation center of the hinge 30. The first rotation arm is connected to the door body 20, and the second rotation arm extends toward the inner container 10. When the door body 20 is in a closed state or an open state, the auxiliary door opening mechanism 50 can exert the acting force on the second rotation arm of the hinge 30. Since the acting force exerted on the hinge 30 by the auxiliary door opening mechanism 50 deviates from the rotation center of the hinge 30, the acting force can make the hinge 30 to have a tendency to rotate around the rotation center of the hinge 30, and then the door body 20 is driven by the hinge 30 to have a tendency to rotate and open relative to the inner container 10.

With the technical solutions of the present disclosure, a door locking function and an automatic door opening function of the dishwasher 100 may be achieved by providing the door lock mechanism 70, the ejection mechanism 40 and the auxiliary door opening mechanism 50. In some embodiments, the door lock mechanism 70 can lock the door body 20 to the inner container 10 to ensure a safety of a washing process of the dishwasher 100. When the dishwasher 100 enters a drying stage, the ejection mechanism 40 exerts the acting force on the door body 20 to unlock the door body 20 from the inner container 10; and the auxiliary door opening mechanism 50 exerts the acting force on the hinge 30 to cause that the door body 20 have a tendency to rotate and open relative to the inner container 10. When the door body 20 is unlocked, the automatic door opening function can be realized under an action of the auxiliary door opening mechanism 50. Since the door body 20, during the drying stage, can be automatically opened to a preset open position relative to the inner container 10, to enable the washing chamber of the inner container 10 to be in communication with an external environment, a circulation of internal and external airflows can be realized. Thus, water vapor in the washing chamber can be quickly discharged to improve the drying effect of the dishwasher. Moreover, since a drying process is implemented by using the circulation of internal and external airflows, a drying temperature in the washing chamber can be set lower accordingly, to enable a reduced energy consumption.

In some embodiments, in order to realize the automatic door opening function with less effort, a bottom of the door body 20 is rotatably connected to the inner container 10 by the hinge 30; the ejection mechanism 40 is disposed on a top of the inner container 10; and the auxiliary door opening mechanism 50 is disposed at a bottom of the inner container 10.

In some embodiments, a bottom of the door body 20 is rotatably connected to the inner container 10 by the hinge 30, and a top of the door body 20 can be rotatably opened and closed relative to the inner container 10. The ejection mechanism 40 is disposed on a top of the inner container 10, and the door lock mechanism 70 is disposed adjacent to the ejection mechanism 40. After the door body 20 is unlocked by the ejection mechanism 40, only a small acting force is needed to be exerted by the auxiliary door opening mechanism 50 on the hinge 30, to cause the door body 20 to be turned outward by a certain angle relative to the inner container 10, followed by that the door body 20 can continue to turn outward under the effect of its own gravity to the preset open position. In some embodiments, by arranging the ejection mechanism 40 on the top of the inner container 10, an arm of force between a point where the ejector 42 of the ejection mechanism 40 exerts the acting force on the door body 20 and a rotation axis of the door body 20 is relatively long according to the lever principle, and thus the door body 20 can be pushed to rotate by only a small driving force which is required to be output by the ejection mechanism 40. In this way, the door body 20 can be unlocked in a more labor-saving manner, and a driving requirement for the ejection mechanism 40 can be reduced, and thus a cost can be reduced. In some embodiments, the ejection mechanism 40 can also be disposed on a left or right side of the inner container 10. The auxiliary door opening mechanism 50 may be disposed at the bottom of the inner container 10 and below the hinge 30. The door body 20 can be continuously kept in a tendency of opening relative to the inner container 10 by the auxiliary door opening mechanism 50 upwardly abutting against the hinge 30. In some embodiments, two opposite sides of a bottom of the door body 20 are rotatably connected to the inner container 10 by the hinge 30 respectively; two opposite sides of a bottom of the inner container 10 are respectively provided with the auxiliary door opening mechanism 50; and each auxiliary door opening mechanism 50 respectively abuts against a corresponding hinge 30. In this way, forces on both sides of the door body 20 are more balanced, and thus the door body 20 can be opened more easily.

Figure 10:
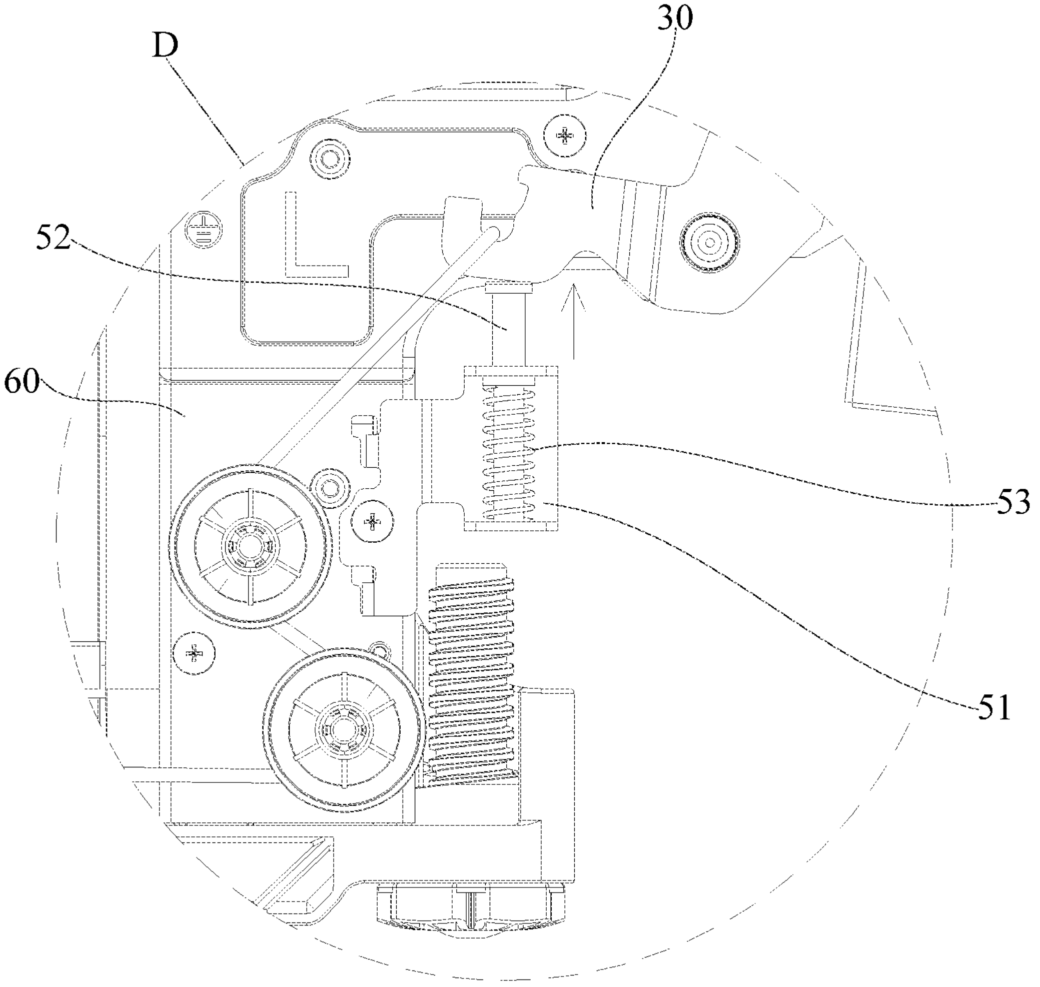
FIG. 10 is a partial enlarged view of a portion indicated by D in FIG. 9.

In some embodiments, as shown in FIG. 8 and FIG. 10, the auxiliary door opening mechanism 50 may include a bracket 51, an abutting member 52 and an elastic member 53. The bracket 51 may be fixed to the inner container 10. The abutting member 52 may be movably mounted on the bracket 51. The elastic member 53 is disposed between the bracket 51 and the abutting member 52, and used to provide a maintaining force for the abutting member 52 to abut against the hinge.

Figure 9:
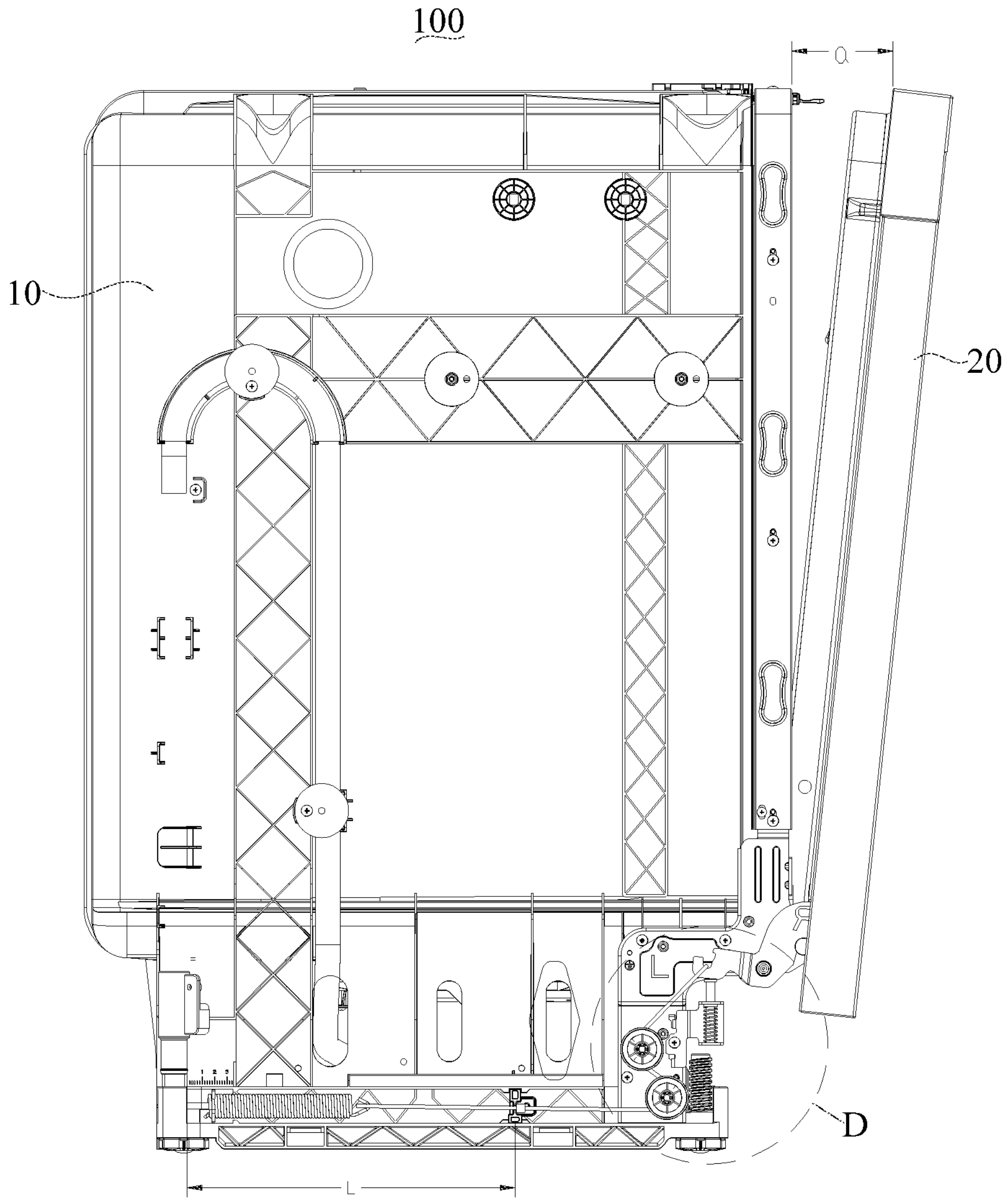
FIG. 9 is a side view of the dishwasher in FIG. 1 with the door body in an open state.

In some embodiments, the bracket 51 can be directly fixedly connected to the inner container 10, or the bracket 51 can be connected to other components on the inner container 10. In some embodiments, the inner container 10 is fixed with a hinge support piece 60, and the bracket 51 and the hinge support piece 60 can be connected and fixed by means of fasteners or welding or the like. In order to ensure an overall structural strength of the auxiliary door opening mechanism 50, the bracket 51 can be made of sheet metal. A flexible connection between the abutting member 52 and the bracket 51 can be realized by a way of sliding or rotating, as long as the abutting member 52 can be driven by the elastic member 53 to move, to cause the abutting member 52 to abut against the hinge continuously during the door body 20 is opened. In some embodiments, the bottom of the door body 20 is rotatably connected to the inner container 10 by the hinge 30. The auxiliary door opening mechanism 50 is provided at the bottom of the inner container 10 and below the hinge 30. The abutting member 52 can slide up and down relative to the bracket 51, and the elastic member 53 can be stretched-compressed and deformed vertically. As shown in FIG. 7 and FIG. 8, when the door body 20 is in the closed state, a top of the abutting member 52 abuts against the hinge 30 to exert the acting force on the hinge 30. At this time, the elastic member 53 is in a compressed state storing an elastic potential energy. As shown in FIG. 9 which is a side view of the dishwasher in FIG. 1 with the door body in an open state, and FIG. 10 which is a partial enlarged view of a portion indicated by D in FIG. 9, during an opening process of the door body 20, the elastic member 53 recovers from the compressed state to an original state and pushes the abutting member 52 to move upwards relative to the bracket 51 and continuously abut against the hinge 30, and then the door body 20 is driven by the hinge 30 to rotate and open to the preset position. In some embodiments, a movement of the abutting member 52 of the auxiliary door opening mechanism 50 is implemented by a stretch-compression movement of the elastic member 53, and thus a simple structure, a little occupied space, and low cost are achieved. In some embodiments, an electric component may be utilized for the auxiliary door opening mechanism 50 to drive the abutting member 52 to perform a protruding and/or retracting movement.

Figure 13:
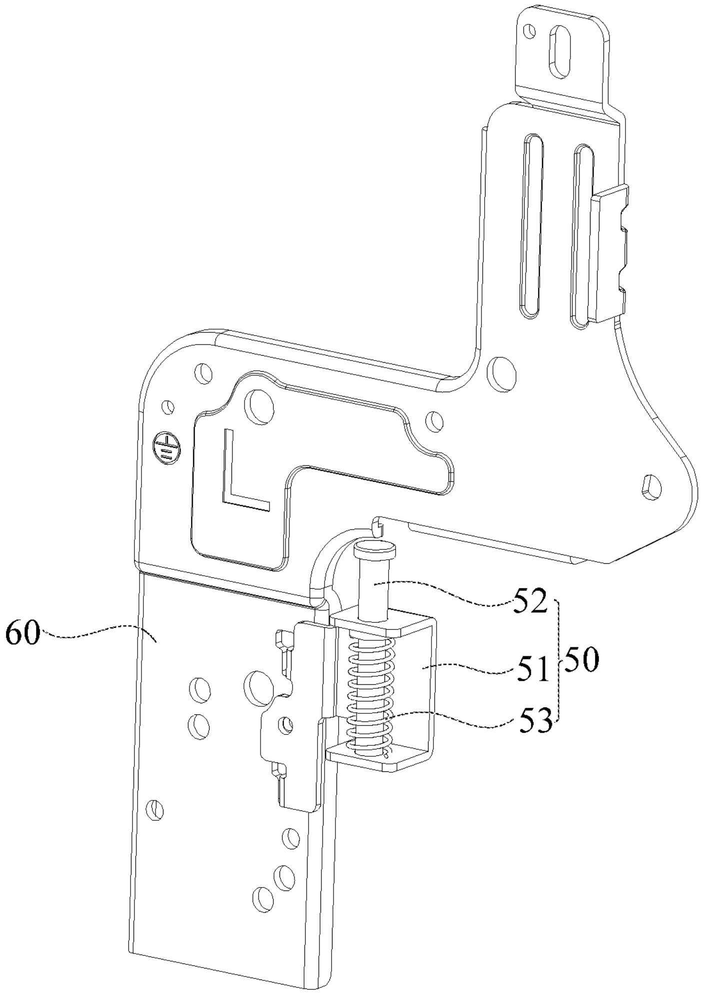
FIG. 13 is a perspective view of an auxiliary door opening mechanism and a hinge support piece of the dishwasher according to some embodiments of the present disclosure.
Figure 14:
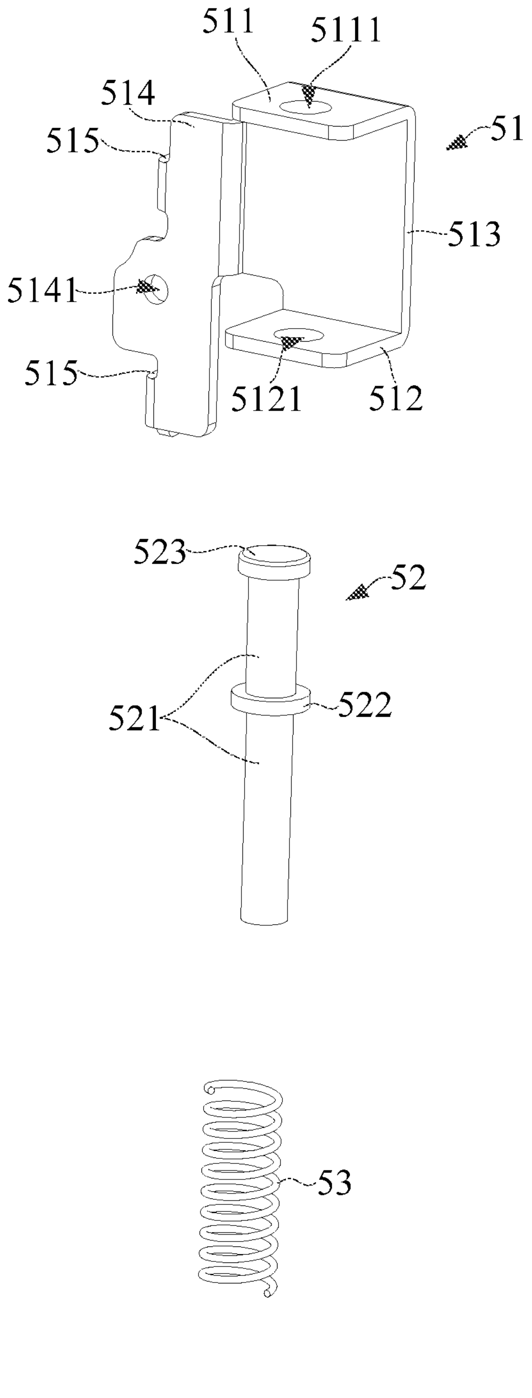
FIG. 14 is an exploded structural schematic diagram of the auxiliary door opening mechanism in FIG. 13.

In some embodiments, as shown in FIG. 13 which is a perspective view of an auxiliary door opening mechanism and a hinge support piece of the dishwasher according to some embodiments of the present disclosure and FIG. 14 which is an exploded structural schematic diagram of the auxiliary door opening mechanism in FIG. 13, the bracket 51 may include a first baffle plate 511 and a second baffle plate 512 that are oppositely disposed and spaced apart. The abutting member 52 may include a push rod 521 and a limiting flange 522 which is disposed on an outer periphery of the push rod 521. The first baffle plate 511 and the second baffle plate 512 are respectively and correspondingly provided with a first through hole 5111 and a second through hole 5121. The push rod 521 is slidably penetrated into the first through hole 5111 and the second through hole 5121. An end of the push rod 521 passes through the first baffle plate 511 and abuts against the hinge 30. The limiting flange 522 is located between the first baffle plate 511 and the second baffle plate 512. An end of the elastic member 53 elastically abuts against the second baffle plate 512, and another end of the elastic member 53 elastically abuts against the limiting flange 522.

In some embodiments, both the first baffle plate 511 and the second baffle plate 512 are disposed horizontally. The first baffle plate 511 and the second baffle plate 512 are vertically disposed at intervals below the hinge 30 in turn. The first baffle plate 511 and the second baffle plate 512 are connected through a connecting plate 513. The first baffle plate 511, the second baffle plate 512 and the connecting plate 513 are joined together to enclose a "⊏"-shaped structure, which is simple and easy to shape, and has a reliable strength. The abutting member 52 may include the push rod 521 vertically extending. A lower end of the push rod 521 passes through the second through hole 5121. An upper end of the push rod 521 passes out of the first through hole 5111 and abuts against the hinge 30. The limiting flange 522 is provided on an outer peripheral edge of a middle part of the push rod 521. An end of the elastic member 53 elastically abuts against the second baffle plate, and another end of the elastic member 53 elastically abuts against the limiting flange 522. When the door body 20 is in the closed state, the elastic member 53 is in a compressed state, and there is a certain distance between the limiting flange 522 and the first baffle plate 511. During an opening process of the door body 20, the elastic member 53 gradually stretches and abuts against the limiting flange 522, and then drives the push rod to move upwards to abut against the hinge 30 until the limiting flange 522 is limited by and abutted against the first baffle plate 511. In some embodiments, the elastic member 53 is sleeved on a periphery of the push rod 521. The elastic member 53 may be a spring or an elastic column of rubber sleeved on the periphery of the push rod 521. The elastic member 53 can be positioned through the push rod 521, and the stretch-compression and deformation of the elastic member 53 also can be guided by the push rod 521. In order to facilitate abutting against an end of the elastic member 53, the limiting flange 522 may be configured as an annular flange surrounding the outer circumference of the push rod 521. In some embodiments, the limiting flange 522 can be integrally formed with the push rod 521, or the limiting flange 522 and the push rod 521 can be formed separately, and then be assembled together. In some embodiments, an external thread can be provided on an outer peripheral surface of the push rod 521 and an internal thread can be provided on an inner peripheral surface of the limiting flange 522, to threadedly connect the limiting flange 522 to the push rod 521. A movement stroke of the push rod 521 can also be adjusted by regulating a fixed position of the limiting flange 522 along an axial direction of the push rod 521.

In some embodiments, an end of the push rod 521 passing out of the first baffle plate 511 is provided with a push head 523 that abuts against and fits with the hinge 30. A cross sectional area of the push head 523 is larger than that of the push rod 521. By providing the push head 523 at an end of the push rod 521, and the cross-sectional area of the push head 523 being larger than that of the push rod 5f21, the push rod 521, during the assembly process, can be prevented from disengaging from the bracket 51 in a direction from the first through hole 5111 to the second through hole 5121. The cross-sectional area of the push head 523 is relatively large, and thus the hinge 30 can be abutted more stably. In order to avoid that the push head 523 deviates from the hinge 30 and cannot play an abutting role during use or transportation, in some embodiments, an end surface of the push head 523 is provided with a groove, and a side edge of the hinge 30 is snapped into the groove.

In order to further ensure a connection reliability between the inner container 10 and the door body 20, as shown in FIG. 8, in some embodiments, the inner container 10 may be fixed with a hinge support piece 60. The hinge 30 is rotatably connected to the hinge support piece 60, and the bracket 51 is fixedly connected to the hinge support piece 60. In some embodiments, the hinge support piece 60, the hinge 30 and the bracket 51 can all be made of sheet metal, which have high structural strength.

Figure 15:
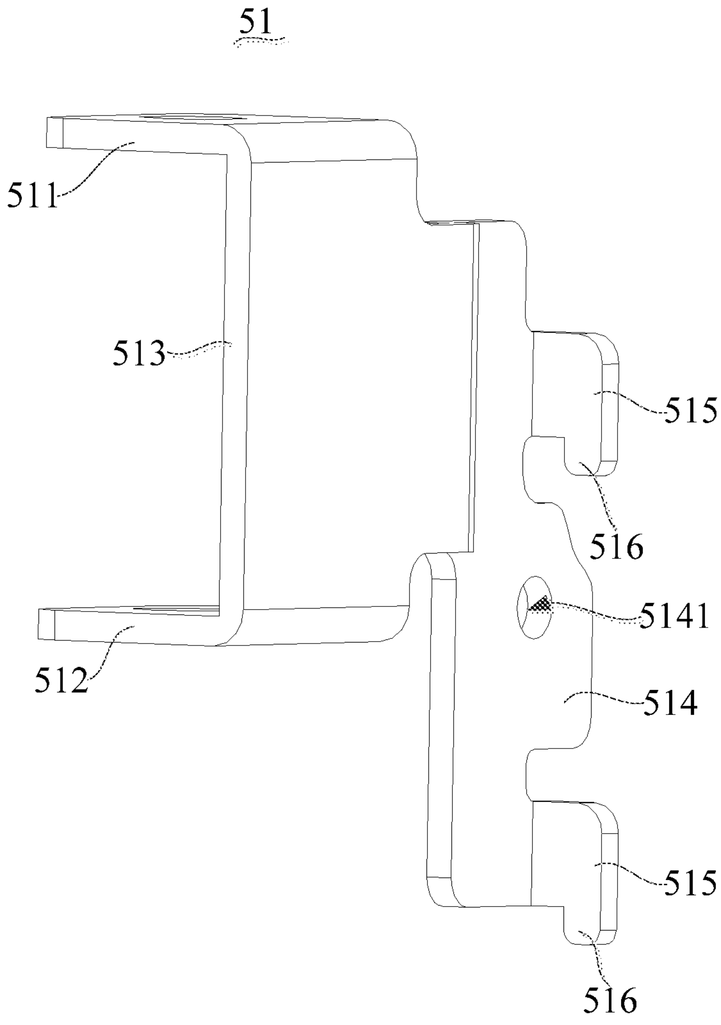
FIG. 15 is a structural schematic diagram of a bracket in FIG. 14.
Figure 16:
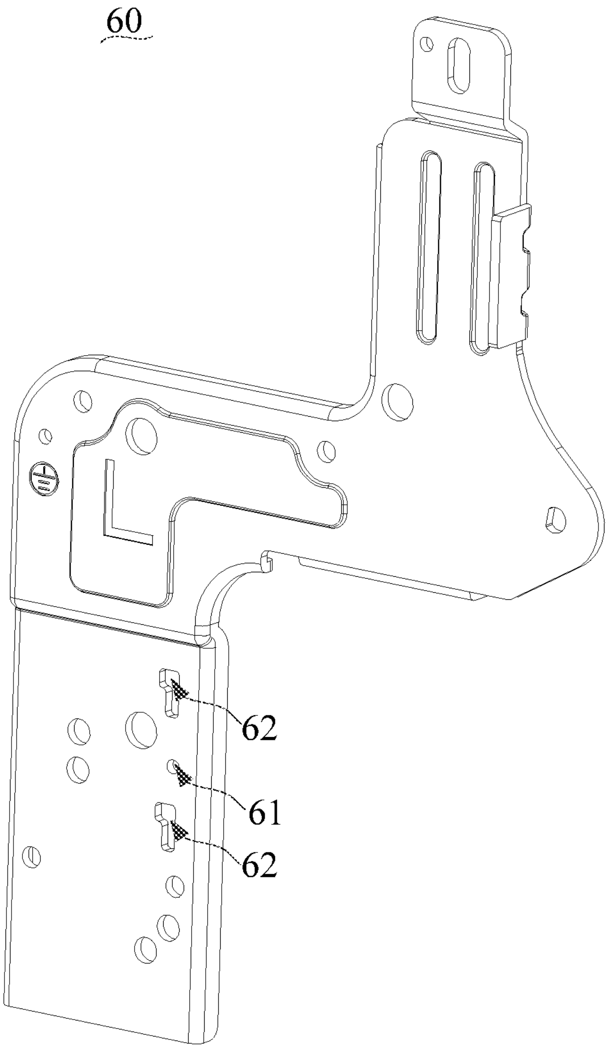
FIG. 16 is a structural schematic diagram of the hinge support piece in FIG. 13.

FIG. 15 is a structural schematic diagram of a bracket in FIG. 14. FIG. 16 is a structural schematic diagram of the hinge support piece in FIG. 13. In some embodiments, as shown in FIG. 13 to FIG. 16, the bracket 51 may include a fixing plate 514 and a fixing foot 515. The fixing plate 514 is arranged opposite to the hinge support piece 60. The fixing foot 515 is bent relative to the fixing plate 514 toward the hinge support piece 60. The fixing plate 514 is provided with a first connection hole 5141 for a first fastener to pass through. The hinge support piece 60 is provided with a second connection hole 61 corresponding to the first connection hole 5141. The hinge support piece 60 is also provided with a fixing hole 62 for the fixing foot 515 to be inserted in and placed on. In some embodiments, during the assembly process, the fixing plate 514 is arranged opposite to the hinge support piece 60. The fixing feet 515 are inserted in and placed on the fixing holes 62 to realize a pre-positioning assembly, and then the first fastener is passed through the first connection hole 5141 and the second connection hole 61 to lock and fix the fixing plate 514 with the hinge support piece 60. Thus, a simple and convenient assembly can be achieved, and an assembly efficiency can be improved.

In some embodiments, as shown in FIG. 15, a snap hook 516 is provided at a bottom of the fixing foot 515. The snap hook 516 is snapped with a side wall of the fixing hole 62. During the assembly process, the fixing foot 515 is firstly inserted into the fixing hole 62 and then is buckled vertically downward, to cause the snap hook 516 to be snapped with a side wall of a bottom of the fixing hole 62, which enable the bracket 51 to be pre-fixed with the hinge support piece 60 in five dimensions of front, rear, left, right, and bottom; and then the bracket 51 are completely fixed with the hinge support piece 60 through the first fastener. A pre-fixation can be realized more conveniently by providing the fixing foot 515 on the snap hook 516, which makes the assembling to be simple and convenient. In this way, a high fixing strength and a good force bearing effect can be achieved, and the mounting of the auxiliary door opening mechanism 50 is more stable and reliable.

In order to further improve a mounting reliability of the bracket 51 and the hinge support piece 60, in some embodiments, the fixing plate 514 is provided with a plurality of fixing feet 515, and the hinge support piece 60 is provided with fixing holes 62 the number of which matches with the number of fixing feet 515. In some embodiments, each fixing foot 515 is provided with the snap hook 516. As shown in FIG. 15 and FIG. 16, in some embodiments, the fixing plate 514 is provided with two fixing feet 515 at intervals along a vertical direction. Each fixing foot 515 is provided with the snap hook 516 extending downwards. The first connection hole 5141 is located between the two fixing feet 515. Correspondingly, the hinge support piece 60 is provided with two fixing holes 62 at intervals along the vertical direction, and the second connection hole 61 is located between the two fixing holes 62. During the assembly process, the two fixing feet 515 are inserted into the corresponding fixing holes 62 at the same time, and then the two fixing feet 515 are buckled vertically downwards, to cause the snap hook 516 to be snapped with the side wall of the bottom of the corresponding fixing holes 62, which enables the bracket 51 to be pre-fixed with the hinge support piece 60 in the five dimensions of front, rear, left, right, and bottom. And then the first faster is passed through the first connection hole 5141 and the second connection hole 61, to lock and fix the bracket 51 with the hinge support piece 60. In some embodiments, the first fastener may include but be not limited to screws, bolts, rivets, and the like.

In some embodiments, as shown in FIG. 13, FIG. 15 and FIG. 16, the bracket 51 may include a fixing plate 514 and a fixing foot 515. The fixing plate 514 extends substantially vertically, and is disposed substantially parallel and opposite to one side of the hinge support piece 60 during the assembly process. The fixing foot 515 can be bent to be substantially vertical to one side of the fixing plate 514, and can be arranged substantially vertical and opposite to one side of the hinge support piece 60 during the assembly process. The fixing plate 514 may be provided with a first connection hole 5141 through which a first fastener passes, and the hinge support piece may be provided with a second connection hole 61 corresponding to the first connection hole 5141. The hinge support piece 60 is also provided with a fixing hole 62 for the fixing foot 515 to be inserted in and placed on. In some embodiments, the fixing hole 62 may be an inverted "L"-shaped socket formed in the hinge support piece 60 by material removal. By providing the "L"-shaped socket, not only a collapse of a body structure of a sheet metal can be avoided when a material of a separate elongated socket-shaped structure is removed by a stamping process, but also the fixing plate 514 can be ensured to still have sufficient structural strength with the "L"-shaped socket formed thereon.

As shown in FIG. 15, in some embodiments, a snap hook 516 extending downwards may also be disposed at a bottom side of the fixing foot 515. The snap hook 516 can be snapped with a side wall of a bottom of a vertical socket portion of the "L"-shaped socket. During the assembly process, the fixing foot 515 can be firstly inserted into the fixing hole 62 along a direction vertical to a body of the sheet metal of the hinge support piece 60, and then the fixing foot 515 can be buckled downwards along an extending direction of the vertical socket portion of the "L"-shaped socket, to cause the snap hook 516 of the fixing foot 515 to be snapped with the bottom side wall of the fixing hole 62. In this way, the bracket 51 can be pre-fixed with the hinge support piece 60 in five dimensions of front, rear, left, right, and bottom. Since the bracket 51 is pre-fixed with the hinge support piece 60 in the five dimensions of front, rear, left, right, and bottom, in some embodiments, a first connection hole 5141 on the fixing plate 514 and a second connection hole 61 on the hinge support piece 60 may both be through holes, and a diameter of the first connection hole 5141 may be larger than that of the second connection hole 61. During the assembly process, the first fastener in the form of a self-tapping screw passes through the first connection hole 5141 and taps a thread on the second connection hole 61 to fasten the bracket 51 with the hinge support piece 60 together, and thus assembling efficiency is greatly improved. In some embodiments, the first connection hole 5141 can be a through hole with a diameter larger than that of the second connection hole 61. The second connection hole 61, in the form of a through hole or a drawing hole, may be pre-provided with a thread on an inner wall thereof, to adapt strength needs of different specifications. Since a pre-fixed structure is formed by snapping the snap hook 516 with the bottom side wall of the vertical socket part of the "L"-shaped socket, the second connection hole 61 and the first fastener may adopt various forms and sizes according to actual usage conditions. In addition, the pre-fixed structure can bear a reaction force generated by the abutting member 52 which abuts against the hinge 30. Therefore, a failure of the first fastener due to repeated impact can be avoided, and the first fastener with a smaller size can be selected. The hinge support piece 60, the hinge 30 and the bracket 51 may all be made of a thinner sheet metal, and thus the space utilization greatly improves and the cost is greatly reduced.

In the above embodiments, the ejection mechanism 40 may include a driving assembly 41 and an ejector 42. In some embodiments, there are various manners in which the driving assembly 41 drives the ejector 42 to move. The driving assembly 41 can drive the ejector 42 to perform a linear reciprocating motion to approach or move away from the door body 20, or drive the ejector 42 to perform a curvilinear reciprocating motion to approach or move away from the door body 20. In some embodiments, the ejector 42 is an ejector extending in a straight line. An end of the ejector is drivingly connected to the driving assembly 41, and another end of the ejector extends toward the door body 20. The driving assembly 41 drives the ejector to perform the linear reciprocating motion. There are many specific manners for the driving assembly 41 to realize the linear reciprocating motion of the ejector 42, including but not limited to a linear driver used to directly drive the ejector 42 to move, or a rotary driver cooperating with a transmission unit used to convert a rotational power into a linear driving force for realizing the movement of the ejector 42. In some embodiments, the transmission unit includes but is not limited to a rack and pinion transmission structure, a nut screw transmission structure, a crankshaft connecting rod transmission structure and the like.

Figure 11:
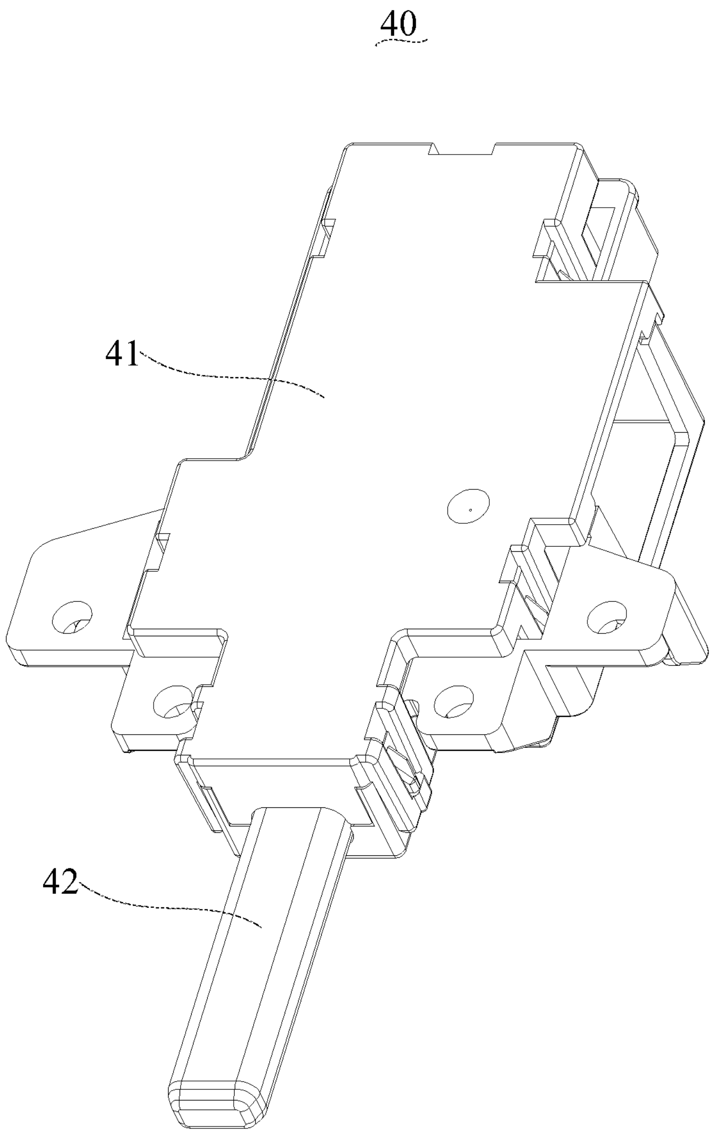
FIG. 11 is a structural schematic diagram of an ejection mechanism of the dishwasher according to some embodiments of the present disclosure.
Figure 12:
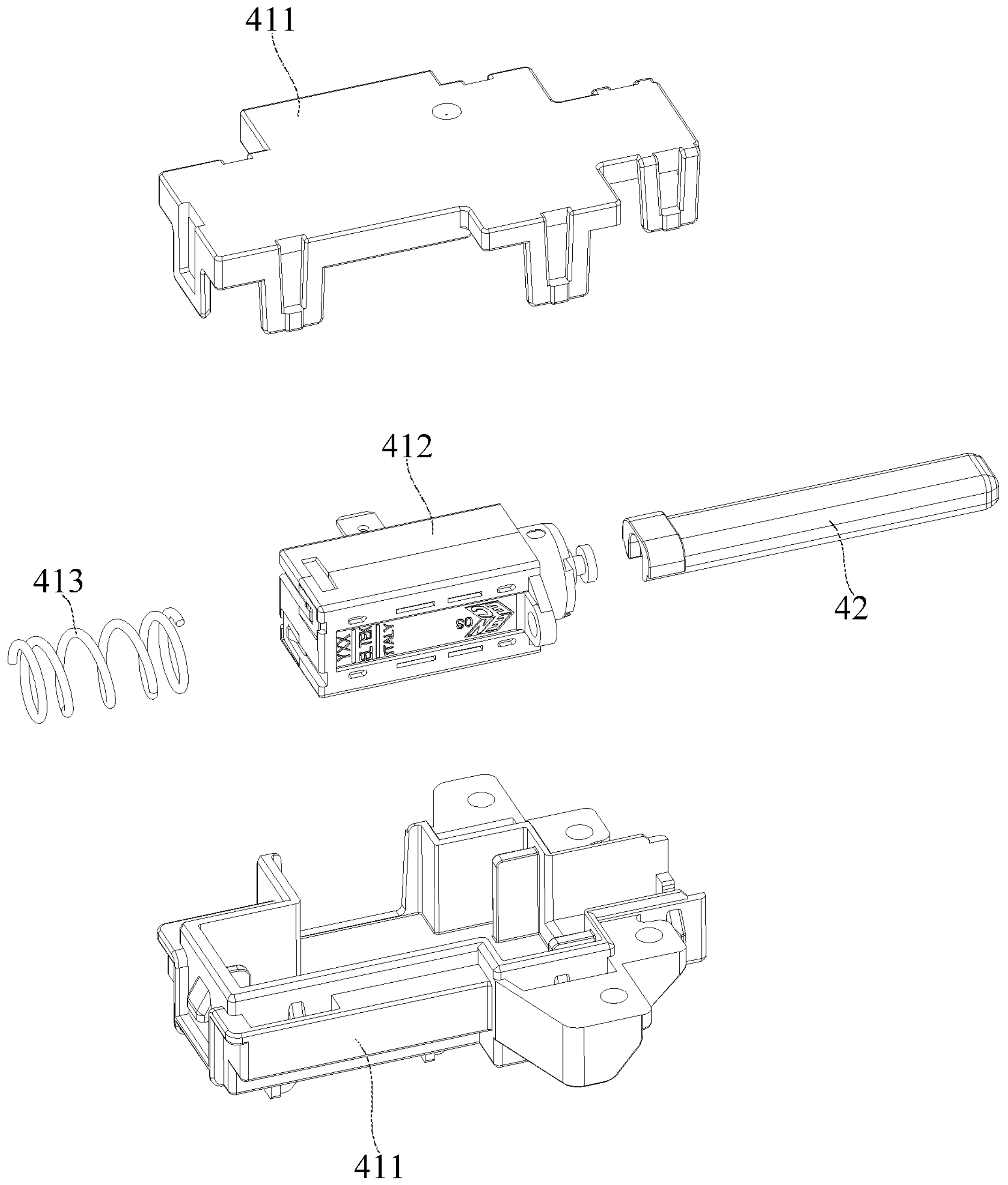
FIG. 12 is an exploded structural schematic diagram of the ejection mechanism in FIG. 11.

FIG. 11 is a structural schematic diagram of an ejection mechanism of the dishwasher according to some embodiments of the present disclosure; FIG. 12 is an exploded structural schematic diagram of the ejection mechanism in FIG. 11.

As shown in FIG. 11 and FIG. 12, in some embodiments, the driving assembly 41 may include a housing 411, a wax motor 412 and an elastic element 413. The housing 411 has a mounting cavity in which the wax motor 412 and the elastic element 413 are all disposed. The wax motor 412 is located between the ejector 42 and the elastic element 413. A driving end of the wax motor 412 is connected to the ejector 42. An end of the elastic element 413 is in elastic abutment with the wax motor 412, and another end is in elastic abutment with the housing 411.

In some embodiments, the housing 411 can be formed by splicing two half-shells together. The two half-shells can be enclosed with each other to form a mounting cavity. In order to facilitate mounting and fixing of the housing 411, lugs are also provided on a side of the housing 411. The lugs are provided with penetrating holes for fasteners to pass through. During the assembly process, the lugs of the housing 411 are mounted and fixed with corresponding mounting positions on the inner container 10 through the fasteners. The wax motor 412 is mounted in the housing 411, and the elastic element can be a compression spring. The wax motor 412, after energized, heated and expanded, can drive the ejector 42 to move. Another end of the ejector 42 can be caused to be able to protrude toward the door body 20, to apply a thrust to the door body 20, therefore the door lock mechanism 70 is driven to be unlocked. In some embodiments, after the wax motor 412 drives the ejector 42 to move to a limit position, the elastic element 413 can be compressed, and the elastic element 413 can play a role in buffering and adjusting deviation, ensuring the structural reliability of the ejection mechanism 40 and facilitating to reduce a production cost.

As shown in FIG. 7 and FIG. 9, on the basis of the above embodiments, the dishwasher 100 may further include a positioning mechanism 80 disposed between the inner container 10 and the door body 20. The positioning mechanism 80 is used to enable the door body 20 to maintain a preset open position relative to the inner container 10. In some embodiments, when the ejection mechanism 40 unlocks the door body 20 from the inner container 10, the auxiliary door opening mechanism 50 may drive the door body 20 to rotate and open relative to the inner container 10. When the door body 20 rotates and opens to a certain angle relative to the inner container 10, the positioning mechanism 80 may exert an acting force on the door body 20 to enable the door body 20 to suspend at the preset open position.

As shown in FIG. 7, in some embodiments, the positioning mechanism 80 may include a tension spring 81, a first pull cord 82, a second pull cord 83, a positioning member 84 and a positioning fitting piece 85. The positioning member 84 may be fixed between the first pull cord 82 and the second pull cord 83. An end of the first pull cord 82 far away from the positioning member 84 is connected to the inner container 10 by the tension spring 81. An end of the second pull cord 83 far away from the positioning member 84 is connected to the hinge 30. The positioning fitting piece 85 is fixed to the inner container 10, and the positioning fitting piece 85 is limitedly abutted against a side of the positioning member 84 that is away from the door body 20.

In some embodiments, as shown in FIG. 9, when the door body 20 is opened to a preset position relative to the inner container 10, an opening distance of the door body 20 is a distance "a", and the opening distance of the door body 20 is jointly determined by the locating member 84, the positioning fitting piece 85 and tension spring 81. In an initial state, a pre-tightening force is set on the tension spring 81. This force f is slightly greater than a force to maintain a door opening state after the door is automatically opened. The positioning fitting piece 85 is designed to be positioned at a distance "L" from a fixed end of the tension spring 81. When the door body 20 is in the closed state, the first pull cord 82 is in a tightened state, and the second pull cord 83 is in a loosen state. During an automatic door opening process, the second pull cord 83 is gradually tightened until the opening distance of the door body 20 is the distance "a", that is, a preset door opening position is reached. By an action of the positioning mechanism 80, the door body 20 can be suspended at the preset door opening position. If the door body 20 is continuously exerted with a door-opening acting force, the positioning member 84 will be disengaged from the positioning fitting piece 85, and the tension spring 81 will be stretched, enabling the door body 20 to be fully opened to 90° relative to the inner container 10.

Figure 5:
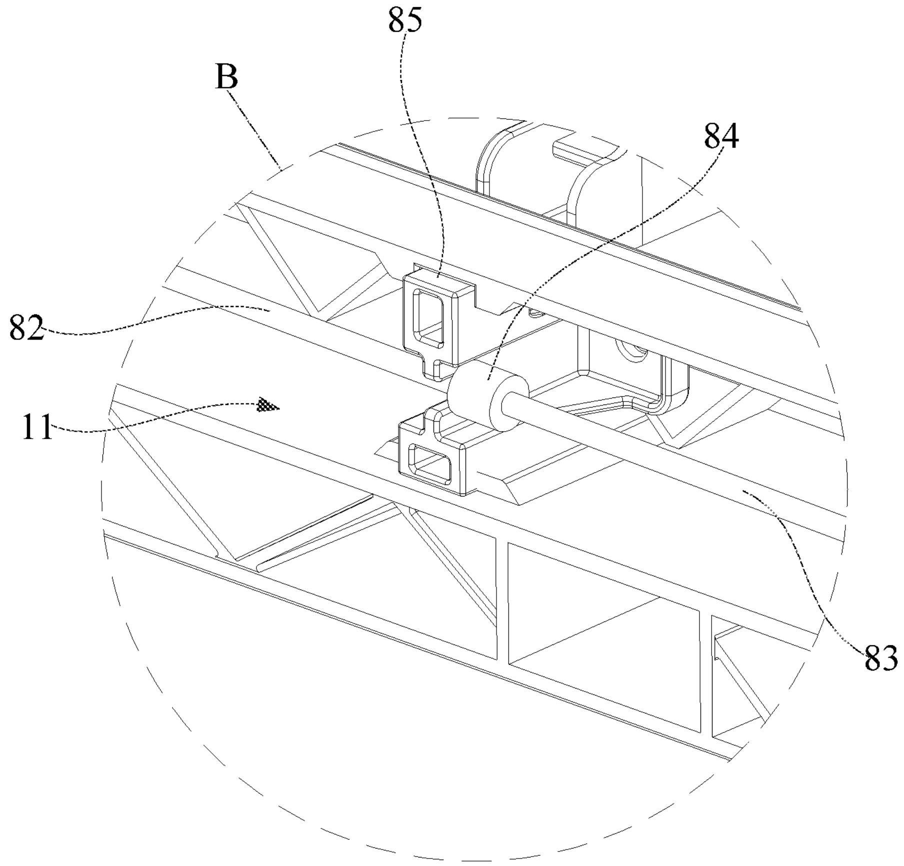
FIG. 5 is a partial enlarged view of a portion indicated by B in FIG. 2.
Figure 6:
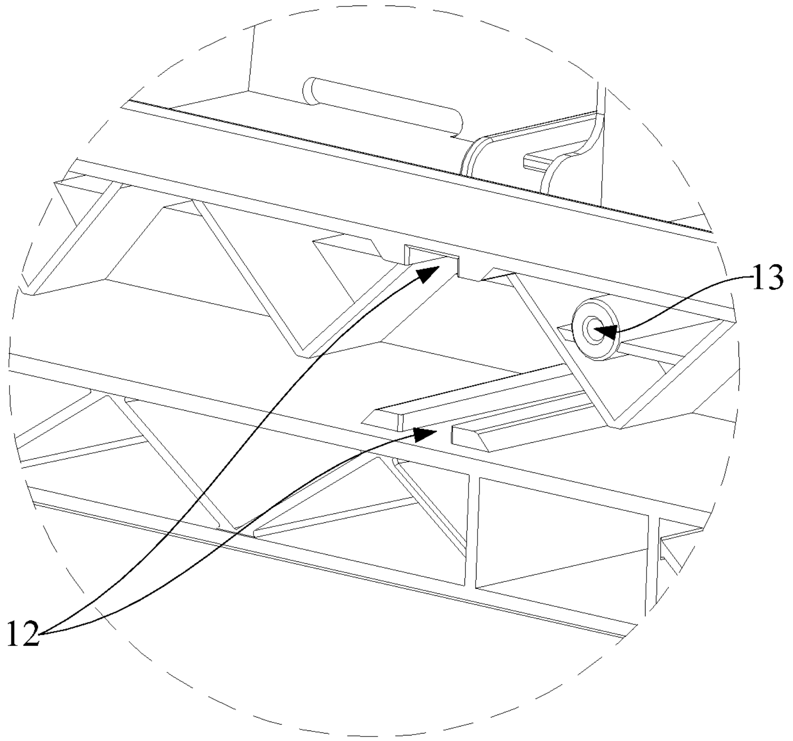
FIG. 6 is a structural schematic diagram of the portion B in FIG. 5 with a positioning fitting piece unassembled.

FIG. 5 is a partial enlarged view of a portion indicated by B in FIG. 2. FIG. 6 is a structural schematic diagram of the portion B in FIG. 5 with a positioning fitting piece unassembled. As shown in FIG. 2, FIG. 5 and FIG. 6, in some embodiments, the inner container 10 is provided with a mounting slot 11. A mounting port is formed on an outer surface of the inner container 10 by the mounting slot 11. The tension spring 81, the first pull cord 82, the positioning member 84 and a portion of the second pull cord 83 are all accommodated in the mounting slot 11, and the positioning fitting piece 85 is fixed within the mounting slot 11.

In some embodiments, the mounting slot 11 is provided at a lower position on the outer surface of the inner container 10, and extends from a rear side toward a front opening located at a front side of the inner container 10 along a horizontal direction. During the assembly process, the tension spring 81 and the positioning fitting piece 85 are firstly mounted in a predetermined position of the mounting slot 11 from the mounting port, respectively, and then an end of the first pull cord 82 is connected to the tension spring 81, and another end of the second pull cord 83 is connected to the hinge 30, to cause the positioning member 84 to be stopped by and fitted with the positioning fitting piece 85.

In order to facilitate the assembling of the positioning fitting piece 85, in some embodiments, the mounting slot 11 has a side groove wall disposed opposite to the mounting port, and a top groove wall and a bottom groove wall respectively disposed on two opposite sides of the side groove wall. The top groove wall and the bottom groove wall each are provided with a snap groove 12. The snap groove 12 extends from the side groove wall toward the mounting port. An end of the snap groove 12 close to the mounting port is formed with a socket for an insertion of the positioning fitting piece 85. Two opposite sides of the positioning fitting piece 85 are snapped with corresponding snap grooves 12, respectively. During the assembly process, the positioning fitting piece is aligned with the socket of the snap groove 12 and pushed inwardly, to snap the positioning fitting piece 85 into the snap groove 12, and thus a simple and convenient operation can be achieved. Moreover, both sides of the positioning fitting piece 85 are provided with the snap grooves 12 for snapping, and thus assembling reliability of the positioning fitting piece 85 can be ensured.

Figure 17:
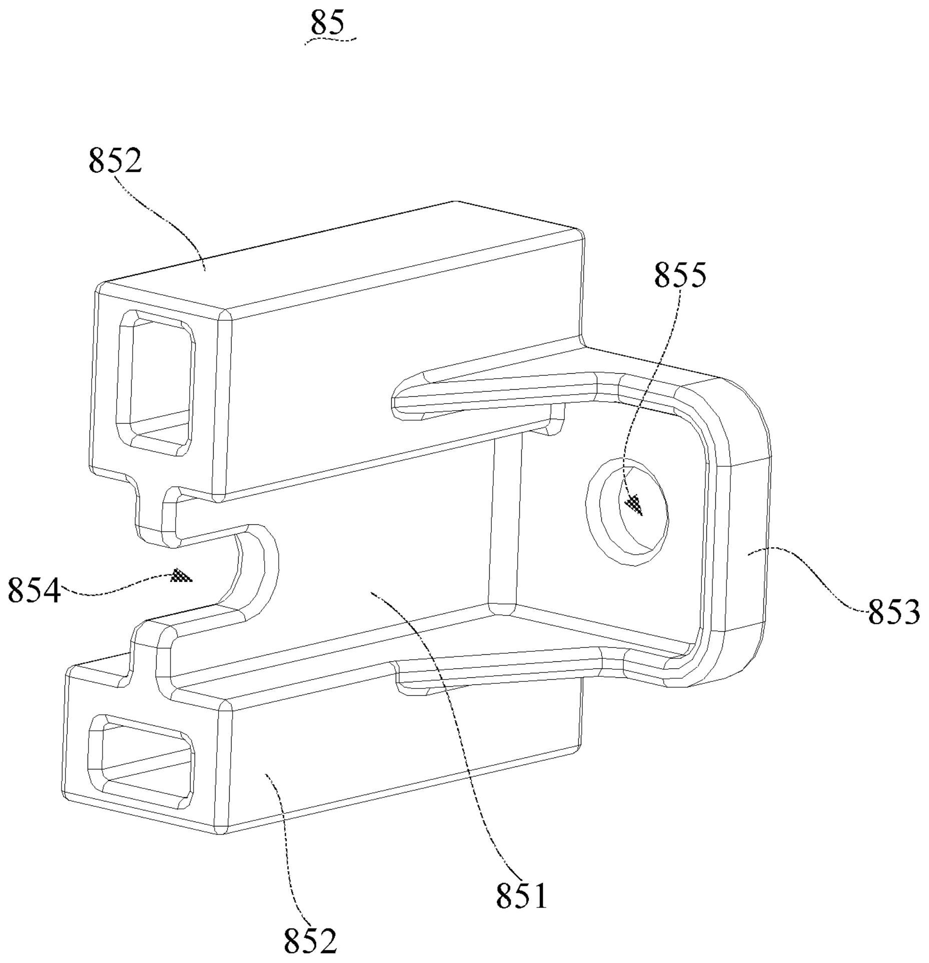
FIG. 17 is a structural schematic diagram of the positioning fitting piece of the dishwasher according to some embodiments of the present disclosure.

In order to further ensure the assembling reliability of the positioning fitting piece 85, as shown in FIG. 6 and FIG. 17 which is a structural schematic diagram of the positioning fitting piece of the dishwasher according to some embodiments of the present disclosure, in some embodiments, the positioning fitting piece 85 may include a fixing part 853 which is disposed opposite to the side groove wall. The fixing part 853 is provided with a first mounting hole 855 for a second fastener to pass through for connecting. The side groove wall is provided with a second mounting hole 13 corresponding to the first mounting hole 855. In some embodiments, the positioning fitting piece 85 may include a positioning part 851 and two snap parts 852 which are disposed on two opposite sides of the positioning part 851. The two snap parts 852 are respectively snapped with corresponding snap grooves 12. The positioning part 851 is provided with a notch 854 through which the first pull cord 82 passes. The positioning member 84 abuts against and fits with the positioning part 851. The fixing part 853 is provided on a side of the positioning part 851 away from the notch 854. The fixing part 853 is disposed opposite to the side groove wall. The fixing part 853 is provided with a first mounting hole 855 for a second fastener to pass through for connecting. The side groove wall is provided with a second mounting hole 13 corresponding to the first mounting hole 855. During the assembly process, the snap parts 852 on upper and lower sides of the positioning fitting piece 85 are firstly snapped into corresponding snap grooves 12, respectively, and then the second fastener is passed through the first mounting hole 855 and the second mounting hole 13 to lock and fix the positioning fitting piece 85 to the side groove wall of the mounting slot 11. As such a simple operation, and a stable and reliable assembling can be achieved. Thus, the positioning fitting piece 85 can bear a relatively large acting force. In some embodiments, the second fastener includes but is not limited to screws, bolts, rivets, and the like. In order to further improve the structural strength of the positioning fitting piece 85, in some embodiments, a reinforcement rib is further provided between the fixing part 853 and the snap part 852. As shown in FIG. 17, upper and lower sides of the fixing part 853 are respectively provided with the reinforcement ribs. Each reinforcement rib is respectively connected to a corresponding snap part 852, as such the structural strength of the positioning fitting piece 85 can be further improved and the service life can be improved.

The above is only some embodiments of the present disclosure, and does not therefore limit the scope of protection sought for by the present disclosure. Under the inventive concept of the present disclosure, any equivalent structural transformation made by using the description of the present disclosure and the contents of the accompanying drawings, or any direct/indirect application in other related technical fields is included in the scope of protection sought for by the present disclosure.

What is claimed is:

1. A dishwasher comprising:
- an inner container having a washing chamber and an opening in communication with the washing chamber;
- a door body;
- a hinge rotatably connecting the inner container and the door body to open or close the opening;
- a door lock mechanism configured to lock the door body to the inner container;
- an ejection mechanism disposed on the inner container and configured to exert an acting force on the door body to cause the door body to be unlocked from the inner container; and
- an auxiliary door opening mechanism disposed on the inner container and configured to exert an acting force on the hinge to cause the door body to exhibit a tendency to rotate and open relative to the inner container, wherein:
- the auxiliary door opening mechanism comprises a bracket, an abutting member and an elastic member;
- the bracket is fixed to the inner container;
- the abutting member is movably mounted on the bracket; and
- the elastic member is disposed between the bracket and the abutting member, and configured to provide a maintaining force for the abutting member to abut against the hinge, and wherein:
- the bracket comprises a first baffle plate and a second baffle plate that are oppositely disposed and spaced apart, and the abutting member comprises a push rod and a limiting flange which is disposed on an outer periphery of the push rod;
- the first baffle plate and the second baffle plate are respectively and correspondingly provided with a first through hole and a second through hole;
- the push rod is slidably penetrated into the first through hole and the second through hole, an end of the push rod passing out of the first baffle plate and abutting against the hinge;
- the limiting flange is located between the first baffle plate and the second baffle plate; and
- an end of the elastic member elastically abuts against the second baffle plate, another end of the elastic member elastically abutting against the limiting flange.

2. The dishwasher according to claim 1, wherein:
- a bottom of the door body is rotatably connected to the inner container by the hinge;
- the ejection mechanism is disposed on a top of the inner container; and
- the auxiliary door opening mechanism is disposed at a bottom of the inner container.

3. The dishwasher according to claim 2, further comprising a positioning mechanism disposed between the inner container and the door body, and wherein the positioning mechanism is configured to enable the door body to be maintained at a preset open position relative to the inner container.

4. The dishwasher according to claim 1, wherein:
- the end of the push rod passing through the first baffle plate is provided with a push head that abuts against and fits with the hinge, and
- a cross sectional area of the push head is larger than that of the push rod.

5. The dishwasher according to claim 4, further comprising a positioning mechanism disposed between the inner container and the door body,
- wherein the positioning mechanism is configured to enable the door body to be maintained at a preset open position relative to the inner container.

6. The dishwasher according to claim 1, further comprising a positioning mechanism disposed between the inner container and the door body,
- wherein the positioning mechanism is configured to enable the door body to be maintained at a preset open position relative to the inner container.

7. A dishwasher comprising:
- an inner container having a washing chamber and an opening in communication with the washing chamber;
- a door body;
- a hinge rotatably connecting the inner container and the door body to open or close the opening;
- a door lock mechanism configured to lock the door body to the inner container;
- an ejection mechanism disposed on the inner container and configured to exert an acting force on the door body to cause the door body to be unlocked from the inner container; and
- an auxiliary door opening mechanism disposed on the inner container and configured to exert an acting force on the hinge to cause the door body to exhibit a tendency to rotate and open relative to the inner container, wherein:
- the auxiliary door opening mechanism comprises a bracket, an abutting member and an elastic member;
- the bracket is fixed to the inner container;
- the abutting member is movably mounted on the bracket; and the elastic member is disposed between the bracket and the abutting member, and configured to provide a maintaining force for the abutting member to abut against the hinge, wherein the dishwasher further comprises a hinge support piece, wherein:

the inner container is fixed with the hinge support piece;

the hinge is rotatably connected to the hinge support piece; and the bracket is fixedly connected to the hinge support piece, and wherein:

the bracket comprises a fixing plate and a fixing foot;

the fixing plate is arranged opposite to the hinge support piece;

the fixing foot is bent relative to the fixing plate toward the hinge support piece;

the fixing plate is provided with a first connection hole for a first fastener to pass through;

the hinge support piece is provided with a second connection hole corresponding to the first connection hole; and the hinge support piece is also provided with a fixing hole for the fixing foot to be inserted in and placed on.

8. The dishwasher according to claim 7, further comprising a snap hook provided at a bottom of the fixing foot, and snapped with a side wall of the fixing hole.

9. The dishwasher according to claim 8, further comprising a positioning mechanism disposed between the inner container and the door body, wherein the positioning mechanism is configured to enable the door body to be maintained at a preset open position relative to the inner container.

10. The dishwasher according to claim 7, further comprising a positioning mechanism disposed between the inner container and the door body, wherein the positioning mechanism is configured to enable the door body to be maintained at a preset open position relative to the inner container.

11. A dishwasher comprising:

an inner container having a washing chamber and an opening in communication with the washing chamber;

a door body;

a hinge rotatably connecting the inner container and the door body to open or close the opening;

a door lock mechanism configured to lock the door body to the inner container;

an ejection mechanism disposed on the inner container and configured to exert an acting force on the door body to cause the door body to be unlocked from the inner container;

an auxiliary door opening mechanism disposed on the inner container and configured to exert an acting force on the hinge to cause the door body to exhibit a tendency to rotate and open relative to the inner container; and a positioning mechanism disposed between the inner container and the door body, wherein the positioning mechanism is configured to enable the door body to be maintained at a preset open position relative to the inner container, wherein:

the positioning mechanism comprises a tension spring, a first pull cord, a second pull cord, a positioning piece and a positioning fitting piece;

the positioning piece is fixed between the first pull cord and the second pull cord;

an end of the first pull cord away from the positioning piece is connected to the inner container by the tension spring;

an end of the second pull cord away from the positioning piece is connected to the hinge;

the positioning fitting piece is fixed to the inner container; and the positioning fitting piece is limited and abutted against a side of the positioning piece that is away from the door body.

12. The dishwasher according to claim 11, wherein:

the inner container is provided with a mounting slot, the mounting slot is formed with a mounting port on an outer surface of the inner container, and the tension spring, the first pull cord, the positioning piece and a portion of the second pull cord are all accommodated in the mounting slot, and the positioning fitting piece is fixed within the mounting slot.

13. The dishwasher according to claim 12, wherein:

the mounting slot has a side groove wall disposed opposite to the mounting port, and a top groove wall and a bottom groove wall respectively disposed on two opposite sides of the side groove wall;

the top groove wall and the bottom groove wall each is provided with a snap groove;

the snap groove extends from the side groove wall toward the mounting port;

an end of the snap groove close to the mounting port is formed with a socket for an insertion of the positioning fitting piece; and two opposite sides of the positioning fitting piece are snapped with corresponding snap grooves, respectively.

14. The dishwasher according to claim 13, wherein:

the positioning fitting piece comprises a fixing part disposed opposite to the side groove wall;

the fixing part is provided with a first mounting hole for a second fastener to pass through for connecting; and the side groove wall is provided with a second mounting hole corresponding to the first mounting hole.

* * * * *